(12) United States Patent
Layton et al.

(10) Patent No.: US 6,916,136 B2
(45) Date of Patent: Jul. 12, 2005

(54) AEROBIC BIOREDUCTION OF MUNICIPAL SOLID WASTE LANDFILL MASS

(75) Inventors: Gordon Layton, Canton, GA (US); Dale Courtney, Douglasville, GA (US); Matthew C. Smith, Athens, GA (US); William H. Johnson, Kennesaw, GA (US)

(73) Assignees: Waste Management Holdings, Inc., Houston, TX (US); Arcadis Geraghty & Miller, Highland Ranch, CO (US)

( * ) Notice: Subject to any disclaimer, the term of this patent is extended or adjusted under 35 U.S.C. 154(b) by 0 days.

(21) Appl. No.: 10/260,833

(22) Filed: Sep. 30, 2002

(65) Prior Publication Data

US 2003/0108394 A1 Jun. 12, 2003

Related U.S. Application Data

(63) Continuation of application No. 09/298,407, filed on Apr. 23, 1999, now Pat. No. 6,481,929.
(60) Provisional application No. 60/083,216, filed on Apr. 27, 1998.

(51) Int. Cl.[7] ................................................. B09B 5/00
(52) U.S. Cl. ............................ 405/129.95; 405/128.15; 405/129.1; 405/128.7
(58) Field of Search ......................... 405/128.15, 128.7, 405/128.1, 129.1, 129.2, 129.95, 258, 303; 210/747, 901

(56) References Cited

U.S. PATENT DOCUMENTS

| 4,077,847 A | 3/1978 | Choi et al. |
|---|---|---|
| 4,410,142 A | 10/1983 | Carlson et al. |
| 4,551,243 A | 11/1985 | Martin |
| 4,826,601 A | 5/1989 | Spratt et al. |
| 4,919,813 A | 4/1990 | Weaver |
| 4,925,552 A | 5/1990 | Bateson et al. |
| 4,968,427 A | 11/1990 | Glanser et al. |
| 5,049,486 A | 9/1991 | Blackwood et al. |
| 5,062,956 A | 11/1991 | Lupton et al. |
| 5,071,755 A | 12/1991 | Nelson et al. |
| 5,139,365 A * | 8/1992 | Chesner ................. 405/129.45 |
| 5,265,979 A | 11/1993 | Hansen |
| 5,324,138 A | 6/1994 | Hansen |

(Continued)

FOREIGN PATENT DOCUMENTS

| DE | 381839 A1 | 12/1989 | |
|---|---|---|---|
| EP | 0 241 320 A2 | 1/1988 | |
| NL | 8602985 | 11/1986 | |
| WO | WO 91/15440 | 10/1991 | |
| WO | WO 95/01311 | 1/1995 | |
| WO | WO 95/03259 | 2/1995 | |
| WO | WO 9637316 A1 * | 11/1996 | ............. B09B/1/00 |

OTHER PUBLICATIONS

Vlassak et al., "Dinoseb as a Specific Inhibitor of Nitrogen Fixation in Soil," *Soil Biol. Biochem*, 8:91–93 (1976).

Wallnofer et al., "Transformation of Dinitrophenol–Herbicides by Azotabacter Sp.," *Chemosphere* 12:967–972 (1978).

(Continued)

*Primary Examiner*—Robert E. Pezzuto
*Assistant Examiner*—Alexandra K. Pechhold
(74) *Attorney, Agent, or Firm*—McDonnell Boehnen Hulbert & Berghoff LLP (57) ABSTRACT

A process for converting municipal solid waste landfills to aerobic conditions that will allow for a highly accelerated and enhanced bioreduction of landfill mass, followed by the optional excavation of the landfill cell materials subsequent to the bioreduction process, separation of excavated materials using trommels, screens, and other means as necessary, production of useable compost materials, and reclamation of recyclable plastics, metal, and glass.

8 Claims, 6 Drawing Sheets

U.S. PATENT DOCUMENTS

| | | | |
|---|---|---|---|
| 5,356,452 A | 10/1994 | Fahey | |
| 5,362,181 A | 11/1994 | DenBesten | |
| 5,387,271 A | 2/1995 | Crawford et al. | |
| 5,564,862 A | 10/1996 | Markels, Jr. | |
| 5,584,904 A | 12/1996 | Dalos | |
| 5,632,798 A | 5/1997 | Funk et al. | |
| 5,636,940 A * | 6/1997 | Hansen | 405/129.7 |
| 5,702,499 A | 12/1997 | Timmenga | |
| 6,024,513 A | 2/2000 | Hudgins | |

OTHER PUBLICATIONS

Doyle et al., "Effect of Dairy Manure and Sewage Sludge on [14–C]–Pesticide Degradion in Soil," *J. Agric. Food Chem.* 26:987–989 (1978).

Chemical Abstracts 92(16), 1980, Abstract No. 134719. [Abstract of Yang et al., Bacterial transforming 2,4,6–trinitrotoluene and their application, Wei Sheng Wu Hsueh Pao 19:408–415 (1979).

Spain et al., "Enzymatic Oxidation of p–Nitrophenol," *Biochem. and Biophys. Research Communications* 88:634–641 (1979).

Parris, "Environmental and Metabolic Transformations of Primary Aromatic Amines and Related Compounds," *Residual Reviews* 76:1–30 (1980).

Kaplan et al., "Thermophilic Biotransfromations of 2,4,6–Trinitrotoluene Under Simulated Composting Conditions," *Appl. Environ. Microbiol.* 44:757–760 (1982).

Hallas et al., "Microbial Transformation of Nitroaromatic Compounds in Sewage Effluent," *Appl. Environ. Microbiol* 45:1234–41 (1983).

Zewald et al. "Biodegradatie Als Bodemsaner ingstechniek," *PT/Civiel Techniek* 39:7–15 (1984).

Braun et al., "Anaerobic Degradation of 2–Aminobenzoate (Anthranilic City) by Denitrifying Bacteria," *Appl. Environ. Microbiol.* 48:102–107 (1984).

Zeyer et al., "Degradation of o–Nitrophenol and m–Nitrophenal by a *Pseudomnas putida*," *J. Agric. Food Chem.* 32:238–242 (1984).

McBride et al., "Metabolism of the herbicide bromoxynil by *Klebsiella pneumoniae* subsp. *ozaenae*," *Appl. Environ. Microbiol* 52:325–330, 1986.

Berry et al. "Microbial Metabolism of Homocyclic and Heterocyclic Aromatic Compounds Under Anaerobic Conditions," *Microbiol.Rev.* 51:43–59 (1987).

Smolenski et al. "Biodegradation of Cresol Insomers in Anoxic Aquifers," *Appl. Environ. Microbiol* 53:710–716 (1987).

Ziegler et al., "Studies on the Anaerobic Degradation of Benzoic Acid and 2–Aminobenzoic Acid by a Denitrifying Pseudomans Strain," *Arch. Microbiol.* 149:62–69 (1987).

Federale, "Mineralization of Monosubstituted Aromatic Compounds in Unsaturated and Saturated Soils," *Can. J. Microbiol.* 34:1037–1042 (1988).

Kuhn et al., "Anaerobic Degradation of Alkylated Benzenes in Denitrifying Laboratory Aquifer Columns," *Appl. Environ. Microbiol.* 54:490–496 (1988).

Tschech et al., "Methanogenic Degradation of Anthranilate (2–Aminobenzoate)," *System Appl. Microbiol* 11:9–12 (1988).

Schink, Principals and Limits of Anaerobic Degradation; Environmental and Technology aspects, in Zinder (ed.), *Biology of Anaerobic Microorganisms*, Wiley, NY pp. 771–846 (1988).

Stevens, "Bioreduction of Dinoseb (s–sec–Butyl–4,6–Dinitrophenol) and Bioremediation of Dinoseb–Contaminated Soils," Ph.D. Thesis, University of Idaho (1989).

Tratnyek et al., "Abiotic Reduction of Nitro Aromatic Pesticides in Anaerobic Laboratory Systems," *J. Argic. Food Chem.* 37:248–254 (1989).

Ziegler et al., "Activation of Aromatic Acids and Aerobic Acid and 2–Aminobenzoic Acid by a Denitrifying Pseudomans Strain," *Arch. Microbiol.* 151:171–176 (1989).

Rafii et al., "Reduction of nitroaromatic compounds by anaerobic bacteria isolated from the human gastrointestinal tract," *Appl. Environ. Microbiol.* 57:962–968 (1991).

Kaake et al., Bioremediation of Soils Contaminated with Herbicide 2–sec–Butyl–4,6–Dinitophenol (Dinoseb), *Appl.Env.Microbiol* 58:1683–1689 (1992).

Gorontzy et al., "Microbial transformation of nitroaromatic compounds under anaerobic conditions," *J. Gen. Microbiol.* 139:1331–1336, (1993).

Preuss et al., "Anaerobic transformation of 2,4,6–trinitrolouene (TNT)," *Arch. Microbiol.* 159:345–353, 1993.

Pumfrey and Roberts, "A Clostridium species that grows on 2,4,6–trinitrotoluene (TNT)," (Abstract), *Abstr. Gen. Meet. Am. Soc. Microbiol.*, (1993).

Rafii and Cernigillia, "Reduction of azo dyes and nitroaromatic compounds by the same extracellular enzyme from Clostridium perfringens," (Abstract), *Abst. Gen. Meet. Am. Soc. Microbiol.*, (1993).

Murphy et al., "Relationship of Microbial Mass and Activity in Biodegradation of Solid Waste", *Waste Management & Research,* 13:485–497 (1995).

Stegman, "New Aspects on Enhancing Biological Processes in Sanitary Landfill", *Waste Management & Research,* 1:201–211 (1983).

Barlaz et al., "Bacterial Population Development and Chemical Characteristics of Refuse Decomposition in a Simulated Sanitary Landfill", *Applied and Environmental Microbiology,* 55:55–65 (1989).

Jones et al., "The Application of Enzyme Activity Measurements to a Study of Factors Affecting Protein, Starch and Cellulose Fermentation in Domestic Refuse", *Eur.J. Appl. Microbiol Biotechnol,* 18:181–185 (1983).

Barlaz et al., "Effects of Prechilling and Sequential Washing on Enumeration of Microorganisms from Refuse", *Applied and Environmental Microbiology,* 55:50–54 (1989).

Stessel et al., "Design Implications of the In–Ground Digester" Air & Waste Managment Presentation at 87th Annual Meeting (1994).

Reinhart, "Full–Scale Experiences with Leachate Recirculating Landfills: Case Studies", *Waste Management & Research* 14:347–365 (1996).

Reinhart, "The Impact of Leachate Recirculation on Municipal Solid Waste Landfill Operating Characteristics", *Waste Management & Research* 14:337–346 (1996).

Berrueta et al., "Anaerobic Treatment of Leachates in a Pilot–Scale UASB: Strategy of Start–Up", *J. Chem. Tech. Biotechnol.* 67:302–314 (1996).

Kayhanian et al., "Development of a Mathematical Model for the Simulation of the Biodegradation of Organic Substrates in a High–Solids Anaerobic Digestion Process", *J.Chem. Tech. Biotechnol,* 66:312–322 (1996).

Stegmann et al., "Enhancement of Degradation: German Experiences", *Sanitary Landfilling: Processes, Technology and Environmental Impact,* 61–82 (1989).

Prism, "Landfill Mining" Technical Brief from the World Resource Foundation (1997).

City of Albany, New York, "Stabilized Waste Placement Research, Development and Demonstration Project", Albany Interim Landfill, Final Report (1993).

Fletcher et al., "Landfill Gas Enhancement Techniques–Laboratory Studies and Field Research".

Stessel et al, "A Lysimeter Study of the Aerobic Landfill Concept", *Waste Management & Research* 10:485–503 (1992).

Murphy, "Aerobic Degradation of Municipal Solid Waste", *Air & Water Presentation at 85th Annual Meeting & Exhibition, Kansas City, Missouri* (1992).

Barlaz et al., "Gas Production Parameters in Sanitary Landfill Simulators" *Waste Management & Research,* 5:27–39 (1987).

Rees, "Optimisation of Methane Production and Refuse Decomposition in Landfills by Temperature Control" *J. Chem. Tech. Biotechnol,* 30:458–465 (1980).

Stessel et al, "Processing of Material Mined from Landfills" *Proceedings of 1992 National Waste Processing Conference,* 101–111.

Stevens et al., "Selection and isolation of bacteria capable of degrading dinoseb (2–sec–butyl–4,6–dinitrophenol)" *Biodegradation,* 2:1–13 (1991).

Goszcynski et al., "Isotopically Labelled Compounds for Hazardous Waste Site Cleanup Investigations: Part I.", *Journal of Labelled Compounds and Radiopharmaceuticals,* vol. XXIX, 35–42 (1991).

Kaplan, "Biotransformation Pathways of Hazardous Energetic Organo–Nitro Compounds", *Biotechnology and Biodegradation,* 155–181.

Naumova, "Possibility of Deep Bacterial Destruction of 2,4,6–Trinitrotoluene", *Kazan State University,* 169–173 (1988).

Simmons, "Oxidative Co–Oligomerization of Guaiacol and 4–Chloroaniline", *Environ. Sci. Technol.,* 23:115–120 (1989).

Gottschalk, "Growth with Aromatic Compounds", *Bacterial Metabolism,* 2d(ed) 157–162 (1986).

* cited by examiner

AEROBIC BIOREDUCTION OF MUNICIPAL SOLID WASTE LANDFILL MASS

This is a continuation of U.S. patent application Ser. No. 09/298,407 filed on Apr. 23, 1999, now U.S. Pat. No. 6,481,929, which in turn claims priority to provisional application No. 60/083,216, filed on Apr. 27, 1998.

BACKGROUND OF THE INVENTION

1. Field of the Invention

This invention relates to a process for injecting air and water into a landfill to create anaerobic decomposition conditions and thereafter decreasing the volume of the landfill, i.e., the landfill air space by aerobic decomposition of decomposable municipal solid waste. Following municipal solid waste aerobic decomposition, the landfill may be mined in order to remove recoverable materials such as metals, plastics, glass and useful humus material. More specifically, this invention is a process and a landfill that includes a novel arrangement of wells for injecting moisture and air into a municipal solid waste undergoing aerobic decomposition in order to efficiently aerobically decompose waste.

2. Description of the Prior Art

The concept of aerobically decomposing a landfill to prepare it for a landfill mining is well known in the prior art. For example, in the article by R. I. Stessel et al. "A Lysimeter Study of the Aerobic Landfill Concept"; *Waste Management and Research* 10:45–503 (1992) the authors describe a process whereby water and air are injected into municipal solid waste in order to aerobically decompose the waste. The article further discloses that following aerobic decomposition, the waste may be mined to remove recoverable materials. More specifically, the Stessel et al. article discloses the use of water including recycle leachate and air to aerobically decompose municipal solid waste at conditions including a moisture content of from about 50 to about 80%.

A similar article by R. J. Murphy et al. "Aerobic Degradation of Municipal Solid Waste" For Presentation at 85th Annual Meeting and Exhibition, Kansas City, Mo. (Jun. 21–25, 1992) discloses aerobic decomposition studies performed on municipal solid waste at conditions including a temperature of from 30 to 89.4° C. (85–192° F.) an average moisture weight range of from 20 to 50% which was increased by leachate and water addition to a range of from 50 to 70%. The Murphy et al. paper also discloses that the aerobically treated municipal solid waste can be mined in order to recover the useful solid portions thereby allowing reuse of the mined landfill area.

Many issued U.S. patents also disclose process that employ aerobic decomposition processes. For example, U.S. Pat. No. 5,324,138 discloses an in-situ process for increasing the capacity of a municipal solid waste landfill using addition of moisture, lime, and physical disturbance to increase aerobic activity.

U.S. Pat. No. 5,356,452 discloses a process for recovering reusable materials subsequent to waste decomposition in an enclosed cell.

U.S. Pat. No. 5,265,979 discloses a high-efficiency waste placement and disposal method for solid waste in a landfill by reducing the size of the solid waste, adjusting the moisture, forming a waste pile, covering the waste pile, and compacting the waste pile. The disclosed method relies on slow anaerobic waste decomposition.

U.S. Pat. No. 5,702,499 discloses a batch process for the conversion of organic solid waste material through thermophilic aerobic digestion via mixing and moisture control.

U.S. Pat. No. 5,049,486 discloses a temperature monitoring method and apparatus for monitoring the temperature within a mass of organic matter moved through a composting vessel.

U.S. Pat. No. 4,077,847 discloses a system for segregating solid waste into ferrous metal, inorganic and organic fractions.

U.S. Pat. No. 4,410,142 discloses a method and an apparatus for composting waste using mixing and aeration.

U.S. Pat. No. 4,551,243 discloses a method to reduce the accumulation of undesirable solid material within an anaerobic digester.

U.S. Pat. No. 5,632,798 discloses a method for aerobic composition of organic waste material using high-flow aeration.

U.S. Pat. No. 5,584,904 discloses a process for reducing solid waste via shredding, anaerobic decomposition, aerobic decomposition, separation of the inorganic and organic waste, reduction of the plastic with solvents, and reduction of the metals with acids.

The prior art describes many methods and apparatus for decomposing municipal solid waste under aerobic or anaerobic conditions and/or mining aerobically or anaerobically decomposed landfills. There, however, remains a need for methods and landfill structures that enhance the delivery of water and air throughout a municipal solid waste a landfill in order to accelerate and control the aerobic decomposition of municipal solid waste.

SUMMARY OF THE INVENTION

The dwindling availability of space on which to site new municipal solid waste (MSW) landfills requires the consideration of reusing existing landfill space. Current bioreduction processes within MSW landfills are uncontrolled anaerobic processes that are inherently slow to occur and which produce high levels of methane gas along with malodorous trace gases. Controlled conversion of these anaerobic processes within MSW landfills to aerobic conditions is useful on a large scale basis as an alternative that will allow for a highly enhanced bioreduction of landfill mass over a much shorter period of time in comparison to conventional aerobic decomposition. The aerobic bioreduction of landfill mass may be followed by landfill mining of reclaimable/recyclable non-biodegraded materials, production of a high quality humus-like material, and reuse of a large volume, and possibly greater than 50 percent of the available landfill volume, thereby significantly extending the useful life of the MSW landfill.

This invention is a process for quickly and thoroughly aerobically decomposing municipal solid waste located in a landfill.

This invention is also a process that efficiently injects water and air into the interior of a municipal solid waste landfill in order to promote and control the aerobic decomposition thereof.

This invention is also a method for reducing landfill air space that uses a novel moisture and air injection system that safely controls the aerobic decomposition temperatures.

Furthermore, this invention is a landfill including a plurality of water and air injection wells located at defined lateral locations and depths with respect to one another in order to facilitate the efficient and controllable aerobic decomposition of landfill municipal solid waste.

In one embodiment, this invention is a method for reducing landfill airspace. The method includes injecting air and moisture into a landfill municipal solid waste layer that includes metal, plastic and biodegradable waste to produce aerobic conditions in at least a portion of the landfill. The moisture and air is injected into the landfill for a period of time sufficient to reduce the landfill airspace. The process improvement is characterized in that the air and moisture are injected into the landfill using a plurality of wells wherein at least one well comprises a bore hole containing a first air injection well located at a first depth below the landfill surface, and a second air injection well located at a second depth from the landfill surface where the first depth and the second depth is separated by a distance of from 10 to about 40 feet.

In another embodiment, this invention is a method for reducing landfill airspace. The method begins by injecting air and moisture into a municipal solid waste layer of a landfill wherein the municipal solid waste includes metal, plastic and biodegradable waste to produce aerobic conditions in at least a portion of the landfill. Air and water injection into the landfill are maintained for a period of time sufficient to aerobically decompose at least a portion of the aerobically decomposable landfill material to thereby reduce the landfill airspace. Following aerobic decomposition of the municipal solid waste, injection is halted and the landfill in mined to remove recoverable materials from the landfill. The process is an improvement over prior art processes in that the air and moisture are simultaneously injected into the landfill using a plurality of wells wherein each wells is separated from each other well by a lateral distance of from about 20 feet to about 100 feet, wherein each well includes a bore hole containing at least a first water/air injection well located at a first depth below the landfill surface, and wherein at least one well includes a borehole having first air and/or moisture injection point located at a first distance from the landfill surface, and a second air/moisture injection point located at a second depth from the landfill surface where the first depth and the second depth is separated by a distance of from 10 to about 40 feet.

In yet another embodiment, this invention is lined or unlined landfill including a plurality of air injection wells and a plurality of water injection wells wherein at least one injection well comprises a bore hole located in the municipal solid waste layer and containing a first air injection well located at a first depth below the landfill surface, and a second air injection well located at a second depth from the landfill surface where the first depth and the second depth is separated by a distance of from 10 to about 40 feet. The lined landfill embodiment of this invention will include one or more of the following elements: a clay seal layer, a liner, a permeable layer. The landfill will include a municipal solid waste layer having a depth of at least 20 feet wherein the liner, if one is used, is located between the clay seal layer and the permeable layer and wherein the permeable layer is located between the municipal solid waste layer and the liner. The unlined landfill embodiment of this invention will include municipal solid waste (MSW) in direct contact with natural materials or soils and mechanical and/or hydraulic barriers such as vertical or horizontal leachate wells.

DETAILED DESCRIPTION OF THE INVENTION

The present invention is a process for the controlled conversion of a municipal waste landfill from anaerobic to aerobic decomposition conditions followed by maintaining the aerobic decomposition conditions for a period of time sufficient to at least partially reduce the volume (i.e. air space) of the municipal solid waste in the landfill. Once the volume of the landfilled municipal solid waste has been reduced, the aerobically decomposed landfill materials may be excavated or mined in order to remove recoverable and recyclable materials therefrom. The process of this invention is useful for quickly reducing the volume of landfilled municipal solid waste in order to allow additional municipal solid waste to be located in an existing landfill without the need for preparing new acreage for municipal solid waste disposal. This invention is also a landfill including a plurality of air and water injection wells for carrying out landfill aerobic decomposition.

An important aspect of this invention is the injection and/or application of air and water into a landfill in a controlled manner in order to achieve and maintain controllable and sustainable aerobic conditions within a very large volume of landfilled municipal solid waste. It is also important that the water and air injection method chosen be relatively inexpensive to install, maintain, and operate.

Figure 1:
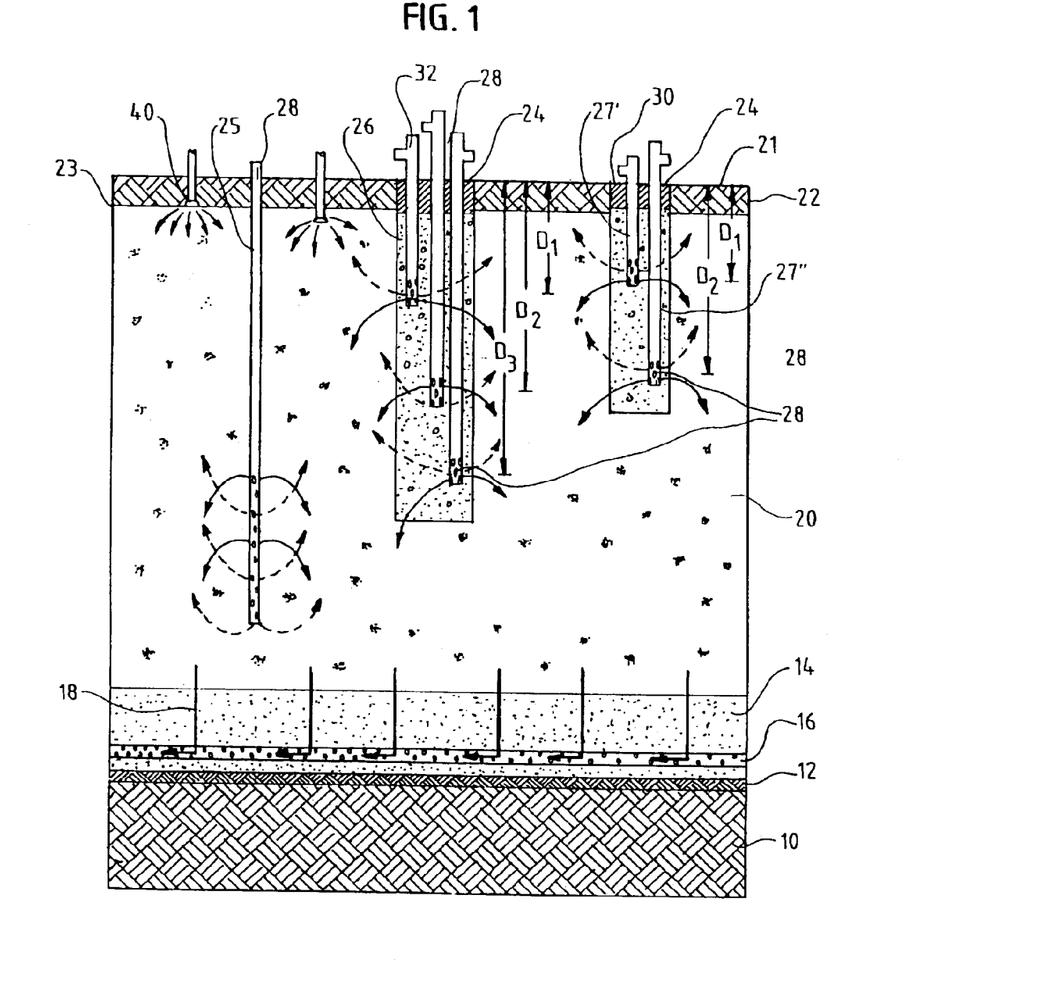
FIG. 1 is cross section view of a landfill including various moisture and air injection well embodiments useful in the processes of this invention.

FIG. 1 is a cross section view of landfilled municipal solid waste including various embodiments of moisture and air injection wells which are useful in processes and landfills of this invention. The landfilled depicted in FIG. 1 is a lined landfill including a foundation layer 10 that is typically a clay material. A plastic or rubber liner 12 is located on top of foundation layer 10. A permeable layer 14 covers liner 12 and further includes leachate collection piping 16 which is located within permeable layer 14. Permeable layer 14 will typically comprise gravel, sand or any material that promotes the flow of landfill leachate towards leachate collection piping 16. The direction of landfill leachate flow is depicted by arrow 18. A municipal solid waste (MSW) layer 20 is located on top of permeable layer 14. The municipal solid waste layer can be quite deep and may exceed 100 to 200 feet in depth. The top of the MSW layer is covered by a soil cap 22 which will typically have a depth from about 1 feet to about 5 feet or more. A top polymer or rubber liner may be placed between the municipal solid waste layer 20 and soil cap 22. However, for purposes of this invention it is preferred that there is no liner between the municipal solid waste layer and the soil cap layer which might impede the diffusion of air injected into the landfill upwardly through the municipal solid waste layer 20, through soil cap 22 and into the atmosphere.

Alternatively, the landfill that is undergoing aerobic bioreduction may be an unlined landfill. An unlined landfill includes a municipal solid waste layer in direct contact with natural materials or soils that form the landfill. In addition, an unlined landfill will generally include mechanical or hydraulic barriers such as vertical or horizontal leachate wells.

The processes and landfills of this invention include a plurality of air injection wells and a plurality of water injection wells located at varying depths and at specific lateral distances from one another. The air and water injection wells provide for the efficient injection of water and air into the landfill. The word "air" as it is used herein refers to any oxygen containing gas including air, pure oxygen, or a mixture of gases that includes oxygen such as carbon dioxide and oxygen. A preferred oxygen containing gas is air. The term "moisture" as it used herein refers to water of any quality including landfill leachate from the landfill cell undergoing aerobic treatment and leachate from other landfills, fresh water, rain water, municipal waste water mixtures thereof and like water sources, such as commercial and industrial liquid waste.

The water and air may be injected into a landfill using water injection wells that are separate from air injection wells or by using a single injection well that is used to inject both air and water into the municipal solid waste layer 20 of a landfill either intermittently or simultaneously. Regardless of the number and types of injection wells used, each air injection point should be separated laterally from each of the air injection at an approximate radius of influence of from about 20 feet to about 100 feet and preferably from about 40 to about 70 feet from each other on a horizontal plane. The water injection wells, when they are separate from the air injection wells should be separated by identical distances.

The term "injection well" as it is used herein refers to pipes, tubes or wells that are drilled into the landfill to allow for the dispersion of water and/or air at specific depths and lateral locations throughout within the landfill. The term "injection well" does not refer to optional water drip points which will be discussed below.

Each air injection well and each water injection well 24 includes at least one vertically oriented injection pipe 27 having a plurality of perforations 25. The perforations 25 may run along the entire length of an injection pipe or the perforations 25 may be located over a narrow length of injection pipe 27 to define an injection region 28. It is preferred that each air injection well and each water injection well include perforations 25 in an injection region 28 wherein the injection region has a length of from about 1 foot to about 20 feet and preferably from about 2.5 feet to about 15 feet. The air injection wells and water injection wells useful in the process and landfill of this invention may include one or more injection regions 28 depending upon the overall depth of the landfill. It is preferred that injection regions 28 are separated by distance of from about 10 to about 40 feet with the top portion of the topmost injection region 28 being located at a depth of from about 5 to about 20 feet below landfill surface 21.

Figure 5:
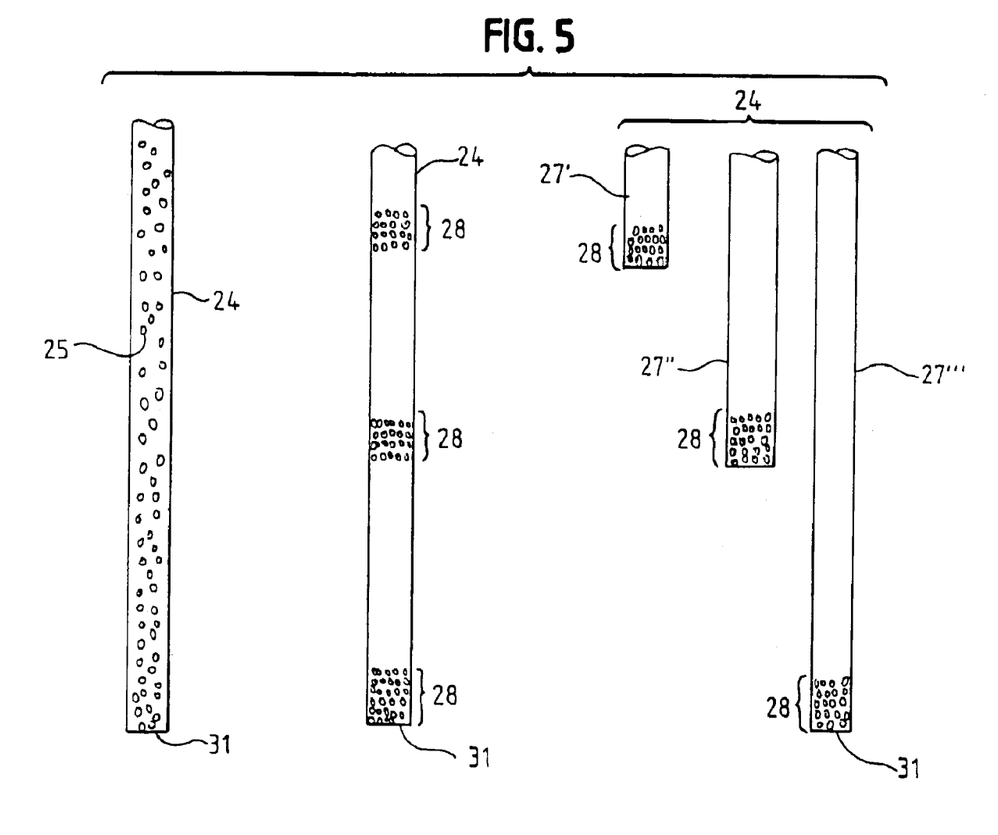
FIG. 5 is an embodiment of water and air injection wells that are useful in the process and in landfills of this invention.

FIG. 5 shows embodiments of some useful injection wells 24 of this invention. The injection well 24 shown on the left side of in FIG. 5 is a single injection well including a plurality of perforations 25 along the entire injection well length. The number and area of perforations 25 preferably increases as the distance to the surface increases to insure that the pressure drop across injection well 24 remains essentially constant over the entire injection well length.

The center well shown in FIG. 5 is a single injection well 24 including a plurality of injection regions 28. The injection regions are located at distances of from about 10 to about 30 feet from one another. Once again, the cross sectional area of the perforations 25 in each injection region 28 preferably increases as the distances of injection region 28 from the landfill surface 21 increases.

The right side of FIG. 5 depicts an injection well 24 that includes a plurality of injection pipes 27. Each injection pipe 27 has a different length and includes an injection region 28 located at bottom end 31 of injection pipe 27. Using a plurality of injection pipes allows for better control of water and air injection rates to various landfill depths which is critical for controlling the MSW aerobic decomposition conditions.

FIG. 1 depicts preferred injection wells 24 of this invention. Preferred injection wells 24 are located in a borehole 26 drilled into municipal solid waste layer 20. Borehole 26 will have a diameter of from about 6 inches to about 3 feet or more and a depth essentially equivalent to the depth of the municipal solid waste layer 20. After drilling, borehole 26 is filled with a sufficient amount of permeable material such as sand or gravel to reach a depth equivalent to the desired depth of the deepest injection pipe 27. A first injection pipe 27' is then placed in the borehole and additional permeable material is placed in the well to a depth equivalent to about the depth of second injection pipe 27". Next, a second injection pipe 27" is located in the borehole such that the second injection pipe bottom end 31 abuts the permeable material layer. Additional permeable material is located in borehole 26 to a depth equivalent to the depth of third injection pipe 27''' and third injection pipe 27''' is then located in the borehole. This procedure is followed until the desired number of injection pipes 27 are located in each borehole. It is preferred that the injection regions 28 of each injection pipe 27 are separated by the distances as defined above. For a single injection well including a multiple injection region 28. Once all injection pipes 27 are in place, a clay seal 30 is placed in the borehole 26. Clay seal 30 prevents gases and liquids from seeping around injection pipes or injection wells and out of the landfill.

For purposes of determining the lateral distances between injection wells, each bore hole 26 that includes a plurality of injection pipes 27 including injection zones 28 of different depths in considered to be a single injection well 24. A preferred process and landfill of this invention will include a plurality of injection wells located in laterally spaced boreholes.

Water and air may be injected into the municipal solid waste layer 20 using the same injection well 24 or by using separate water injection wells and air injection wells. It is preferred that water and air are injected simultaneously into the municipal solid waste using the same injection well 24 and or the same injection pipes 27. It is also preferred that the air that is injected into the municipal solid waste is at least partially saturated with water. Saturating the air with water prevents the air from scavenging moisture from the moist municipal solid waste that is undergoing aerobic decomposition. The air injected into the municipal solid waste may be saturated with water by any method known in the art. It is preferred however to use spray nozzles or drip points located in manifolds associated with the top of injections pipes 27 to saturate the air that is entering the injection wells.

Each injection pipe is designed to inject air and water into an area municipal solid waste having a volume of from about 10 to about 50 cubic feet. It is preferred that each injection pipe be capable of injecting from about 100 to about 700 gallons of water per day and preferably from 300 to 500 gallons per day. In addition, it is preferred that each injection pipe be sized to be capable of injecting from about 0.02 to about 0.1 pounds of oxygen per min per 1000 cubic yard of trash.

The landfill injection pipes and landfill injection wells should be made of materials that are inert to water, air and leachate, aerobic and anaerobic degradation products and that is has a melting point that is higher than the temperatures experienced during aerobic landfill decomposition. It is preferred that the landfill injection pipes and wells are manufactured out of PVC, CPVC, or HDPE.

It is very important that municipal solid waste treated by the process of this invention is initially well saturated with water prior to injecting air into the landfill to begin the aerobic decomposition process. Water should be injected into each injection for a period of time ranging from about 2 weeks to about 2 months or longer prior to beginning air injection into the municipal solid waste. Furthermore a plurality of water drip points 40 may be used to speed the saturation of the landfill municipal solid waste. Drip points are preferably short tubes manufactured by Rain Bid Co. or equivalents thereof that are sized to permit the flow of a constant volume amount of water through the tubes per hour. The outlet of drip tubes 40 may be located on landfill surface 21 or they may be located from about 6 inches to about 5 feet or more below the landfill surface. It is preferred that drip tubes 40 are located at about the interface 23 between soil cap 22 and municipal solid waste layer 20. It is also preferred that drip tubes 40 are laterally spaced from one another by a distance of from about 1 foot to about 10 feet or more, and preferably from 1 foot to 3 feet apart. Finally, each drip tube 40 should have a flow rate of from 1 to about 24 gallons per hour. Once the landfill is saturated with water the drip points may continued to be used to apply water to the landfill.

Controlling the air injection rate and water injection rate into the landfill undergoing aerobic decomposition is important for controlling decomposition temperatures. We have discovered that aerobic conditions are reached within the landfill about a day or so after air injection is initiated. It is preferred that the temperature of the municipal solid waste undergoing aerobic decomposition be maintained at from about 110 to about 140° F. We have discovered that temperatures in excess of 140° F. within the landfill indicates that anaerobic decomposition is beginning to occur instead of aerobic decomposition. In order to convert the primary mode of decomposition back to aerobic and, in turn, decrease the temperature of municipal solid waste undergoing undesired anaerobic decomposition, additional air and water are injected into the area of the landfill experiencing high temperatures.

The processes and landfills of this invention do not use any type of vent piping. The gaseous reaction products of the aerobic decomposition, consisting primarily of inert gases and carbon dioxide, permeate upwards through the landfill municipal solid waste layer 20, through soil cap 22, and into the atmosphere. We have discovered that the soil cap acts as a filter layer and retains many of the malodorous components from the gases that are emitted from the landfill during the aerobic decomposition process. Furthermore we have also discovered that the gas evolved during the aerobic decomposition process are less malodorous than gases emitted from an landfill undergoing anaerobic decomposition.

Figure 2:
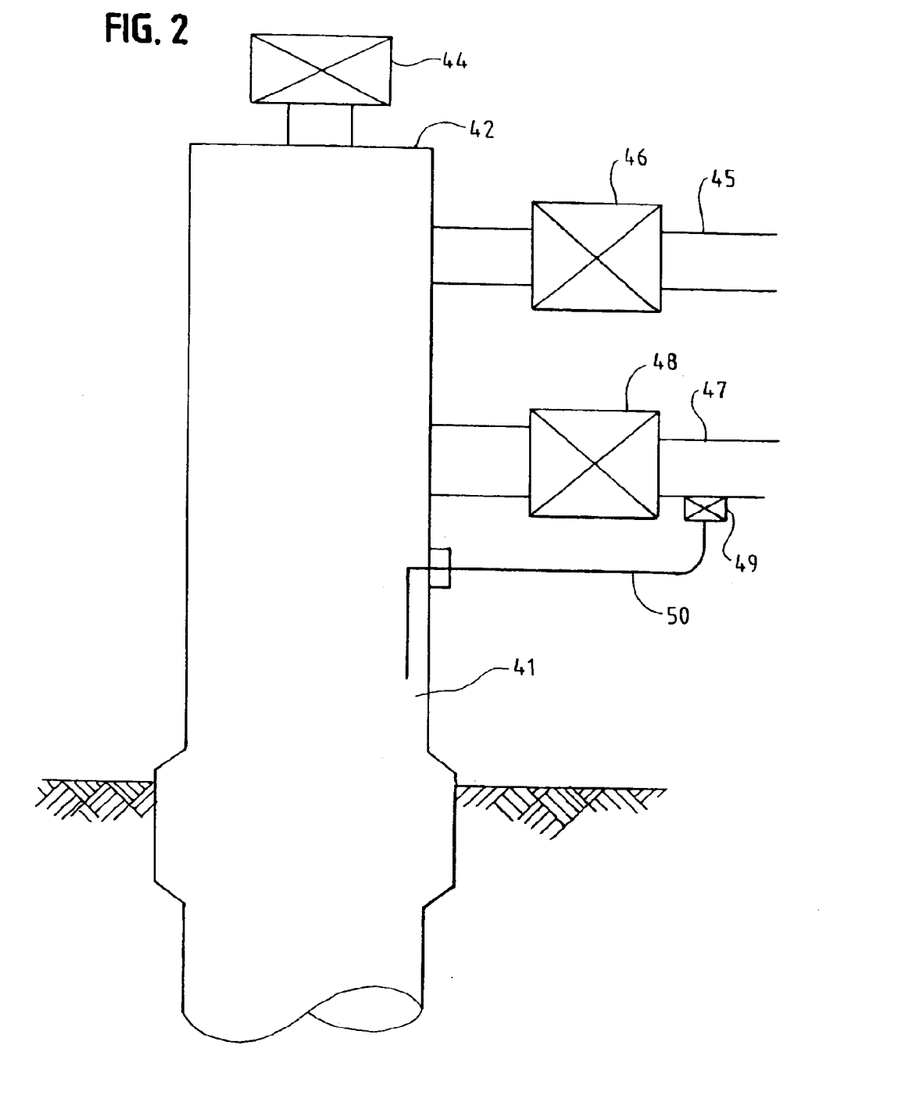
FIG. 2 is a piping manifold useful in a preferred moisture and air injection well of this invention.

FIG. 2 depicts an injection manifold 41 that is useful as a cap over each injection pipe 27 that is used in injection wells 24 of this invention. Manifold 41 is located at and above surface 23 of the landfill undergoing aerobic decomposition. The manifold top 42 is sealed and includes a valve 44 that may be used to sample gases entering or being emitted from injection pipe 27. Each manifold has several inlet pipes. First inlet pipe 45 is used to direct air into injection pipe 27. Valve 46 is an on/off valve that is used to either direct air into injection pipe 27 or to prevent air from being injected into injection pipe 27. Second inlet pipe 47 supplies water to injection pipe 27. Second injection pipe 47 includes a valve 48 which is used to allow or to prohibit water flow into injection pipe 27 in large quantities. Typically, the second inlet pipe will be used only to flood portions of the landfill to control temperature excursion during aerobic degradation. A smaller third inlet pipe 50 is used to inject water into each injection pipe 27 under normal operating conditions. Valve 49 is used to control the flow of water through third injection pipe 50. Third injection pipe 50 is typically a drip tube that is sized to have a specific flow rate and preferably a flow rate from about 1 to about 24 gallons per hour. By sizing third injection pipe 50 to provide a known constant flow of water, less operator time is needed to control the water injection into each injection pipe 27.

Figure 3:
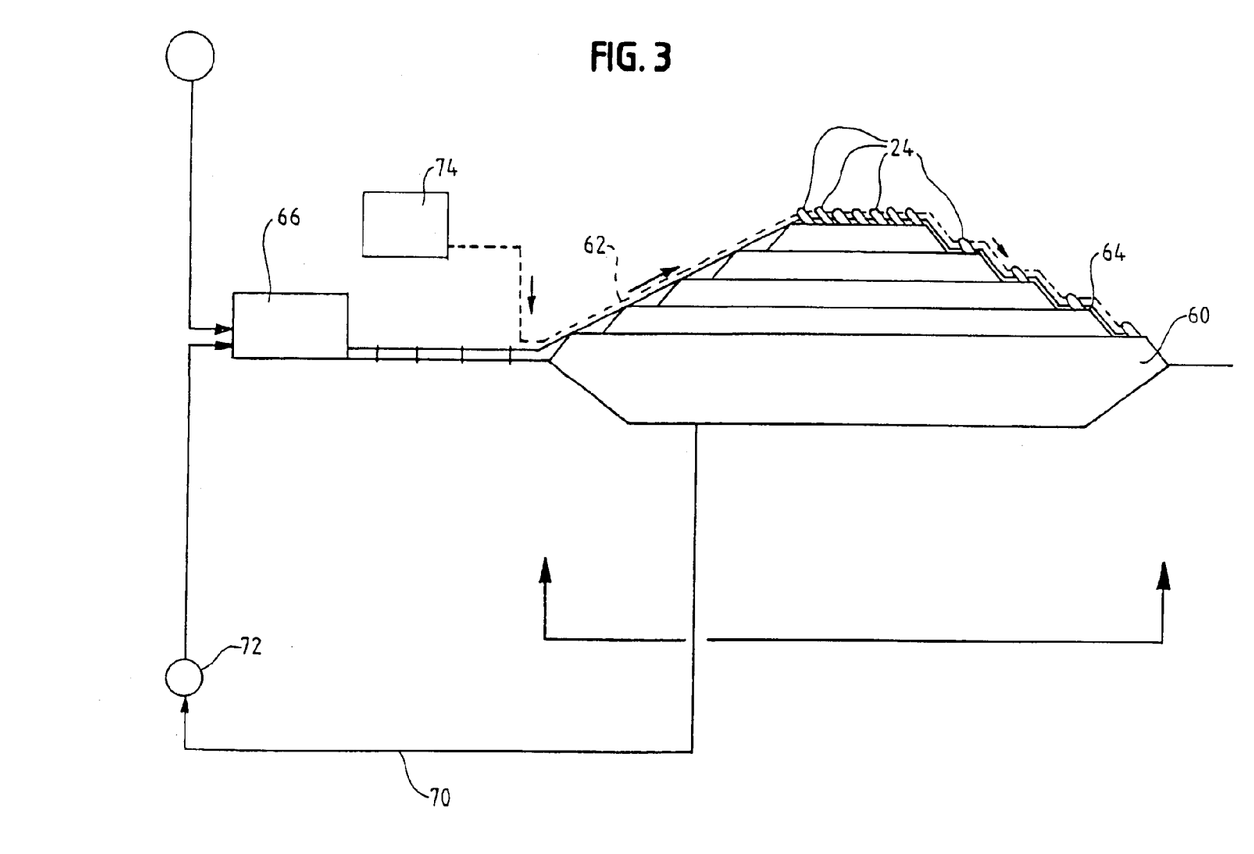
FIG. 3 is side schematic view of an aerobic landfill decomposition process of this invention.
Figure 4:
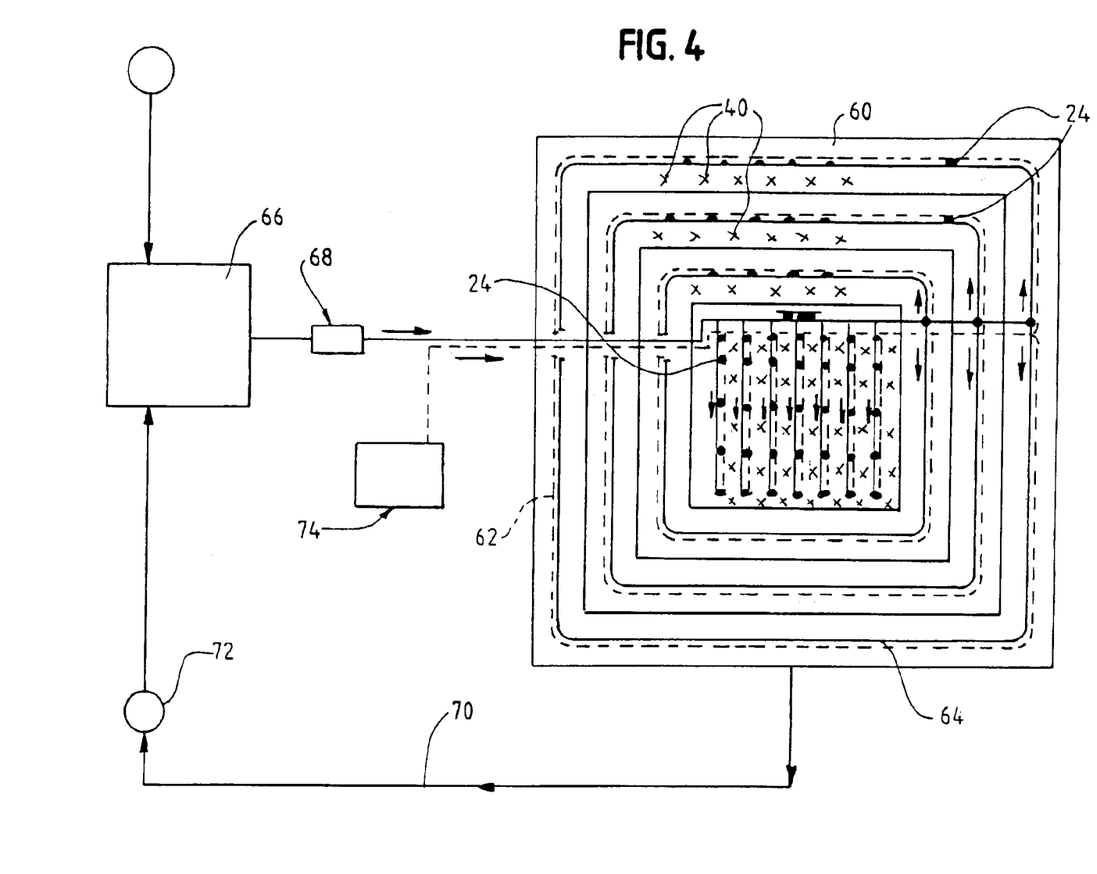
FIG. 4 is a top schematic view of an aerobic landfill decomposition process of this invention.

FIGS. 3 and 4 are side view and overhead schematic views of a landfill of this invention including a multiple air and water injection wells. The process and landfill include a landfill cell 60 throughout which a network of air piping 62 and water piping 64 are distributed on the landfill surface. Injection wells 24 are located uniformly over the entire landfill cell 60. The water that is injected into the landfill during aerobic decomposition is held in water holding tank 66 which is associated with a pump 68. Pump 68 pumps the water through water injection pipe 64 and into injection wells 24 and drip points 40. The water in water holding tank 66 consists of leachate withdrawn from the landfill combined with ground water or water from any secondary water source. The leachate flows from the landfill into leachate collection line 70. A leachate collection sump 72 pumps the leachate into water holding tank 66. Air is supplied into air piping 62 via one or more blower units 74. The blower units 74 compress atmospheric air to a desired pressure and discharge the compressed air into air piping 62 and thereafter into the injection wells.

Manual valves, control valves, automatic controllers, or manual controllers may be used to regulate the flow of air and water into landfill cell 60 via injection wells 24. Alternatively or in addition to manual or automatic control systems, the valves associated with manifolds 41 may be used to regulate the air and water injection rates into landfills undergoing aerobic decomposition.

Monitoring of the aerobic process occurs through the use of in-situ wells specifically designed for monitoring purposes. Prior to initiation of water/leachate injection, a background leachate sample is collected and analyzed for parameters of interest. The leachate quality is then routinely monitored during the degradation process for indications of change and volume of leachate. Prior to beginning the injection of air, a background in-situ landfill gas sample is collected along with collecting flux-gas samples (gases that have percolated through the landfill cover) for comparison. Temperature is measured continuously at each of the monitoring wells. When temperatures exceed desirable levels, additional water and air is added to areas in and near the affected zone to assist in reducing the temperature impact to nominal levels. Monitoring wells for gas and temperature are placed in the landfill cell at an approximate ratio of 1 monitoring well for every eight to ten injection wells.

The process is sufficiently complete when substantial indication of settlement appear and the temperatures measured throughout the cell have been reduced to below 120 degrees F. for a continuous period of time. Once the landfill is considered reduced, the landfill excavation and separation of in-situ material can begin. The goal of the landfill excavation is to separate the compost material from other recyclable materials such as plastics, metals, and glass. Ideally, several streams of product will be available for use subsequent to the excavation and separation process. This invention should have the capability of reducing the volume of landfill mass by as much as 80 percent.

This invention includes the conversion of the in-situ landfill process from anaerobic to aerobic metabolism. The amount of moisture needed for the process to be successful results in the requirement for a supplemental water supply. Since landfills produce leachate which is collected into a retention system, the water injected into the landfill can incorporate the landfill-produced leachate as a water source. However, the volume of leachate typically produced by a properly designed landfill is insufficient to supply the process requirements. The moisture content of the in-situ waste, prior to and during injection of air into the landfill, should be around 60 percent. The moisture content of the in-situ waste provides a water source and growth medium for bacterial decomposition, while at the same time providing a heat transport mechanism to move heat away from areas of high aerobic activity. The maintenance of a high percentage of moisture allows for the temperature of the landfill to be maintained at a stable and desirable level. The target range of temperature for this invention is 120- to 140 degrees Fahrenheit.

Air is supplied via piping and valved wellheads using blowers and/or compressors dependent upon the backpressure of the injection wells.

EXAMPLE 1

Controlled aerobic landfill decomposition was demonstrated using a landfill test cell at the Live Oak Landfill in Georgia. Municipal solid waste was accepted for disposal in the demonstration cell following the standard operating procedure for the landfill. The waste was arranged in lifts and the individual lift covers were removed daily prior to adding trash (typical operation for this landfill), resulting in a compacted trash cell with no intervening layers of cover. Upon completion of the test cell, a soil cap, 1- to 1.5 feet deep, was installed.

The completed demonstration cell was surveyed, a topographic map was produced and grid points for injection wells were established. Initially, the wells were segregated and placed at grid points in relation to air or leachate injection. Eighteen individual air injection wells were installed at depths ranging from 15 feet to 20 feet. Twenty-seven leachate-injection wells, with depths ranging from 5 feet to 15 feet, were installed in four zones. Injection zones for the air-injection wells were 10 feet to 15 feet in length, while injection zones for the leachate-injection wells were 2 feet to 4 feet. Two wells were installed to allow in-situ monitoring of temperature at shallow, mid, and deep levels.

Injection well manifolds were completed with a ball valves on an influent hose attachment and a removable cap. A later field modification included the addition of a control valve to allow for injection of both air and leachate into each well, as well as a sample port to allow sampling of in-situ gas stream.

An air and leachate injection control system was designed to allow individual control of each air injection well and zonal control of the leachate injection. The air control system controlled pressure and volume of the air supplied through the compressor system (a 220-cubic feet air supply compressor). The landfill gas was monitored for methane, carbon dioxide, and oxygen.

The leachate recirculation system included flow measurement instrument and allowed the flow of the leachate into each leachate injection zone to be individually adjusted. It is also provided for the addition of necessary supplement water. Within each zone, the flow of water to an individual injection well was controlled by the ball valve. The leachate was collected, when available, from the cell leachate collection sump using a solenoid valve and pump. Collected leachate was transferred to a leachate holding tank, then pumped into the zones. Flowmeters on all key lines measured the volume of leachate and any supplemental water.

Because moisture is a significant requirement for microbial degradation, the injection of leachate occurred first, which lasted approximately four weeks, recycling approximately 100,000 gallons of leachate and supplemental water into the test cell. Once the leachate system was operating correctly and after leachate had been added into the test cell for about one more, air injection was begun the cell. Concentration levels of methane, carbon dioxide and oxygen were measured prior to the introduction of air and two days after. Levels of methane and carbon dioxide were 40 to 60 percent prior to air injection but were substantially reduced to single-digit percent levels subsequent to air injection. No measurable oxygen was detected prior to air injection, but several percent were measured subsequent to the air injection.

During the first few weeks of air injection, the leachate injection wells were uncapped to allow venting of produced methane and carbon dioxide gases. In-situ temperatures increased substantially above the ambient temperature at several well locations. Methane and carbon dioxide gases decreased significantly and remained at relatively low levels. The measured carbon dioxide levels at first decreased to low percentage levels, then began a slow rise into the 10 to 20 percent range, coinciding with the rise in temperature and lowering of molecular oxygen levels. This indicated the aerobic consumption of oxygen and the production of carbon dioxide and heat.

After about 3 months temperatures within the test cell were near 100 to 110 degrees Fahrenheit (F) at several locations. When landfill gases were sampled from vents in the leachate injection wells, the injection well gas sample points had varied rates of gas outflow from within the test cell, which appears to show that the aerobic activity was not uniformly distributed throughtout the cell. A few leachate injection well gas sample points had gas outflow rates approaching 200 liters per minute (L/m). Analytical data from the laboratory analyses of the leachate showed a substantial increase in the chemical oxygen demand (COD) and biochemical oxygen demand (BOD) when compared to data acquired prior to starting the system. Based on the rapid onset of the aerobic activity and the rise in temperature, batch-cultured microorganisms were not added.

After 4 months following initial air injection, effluent gas measurements showed that a portion of the test cell remained strongly aerobic, but the other side of the test cell was showing a rise in methane production. The temperature in the portion of the test cell was increasing to levels substantially higher than the planned range of 120 F. to 140 F.

Figure 6:
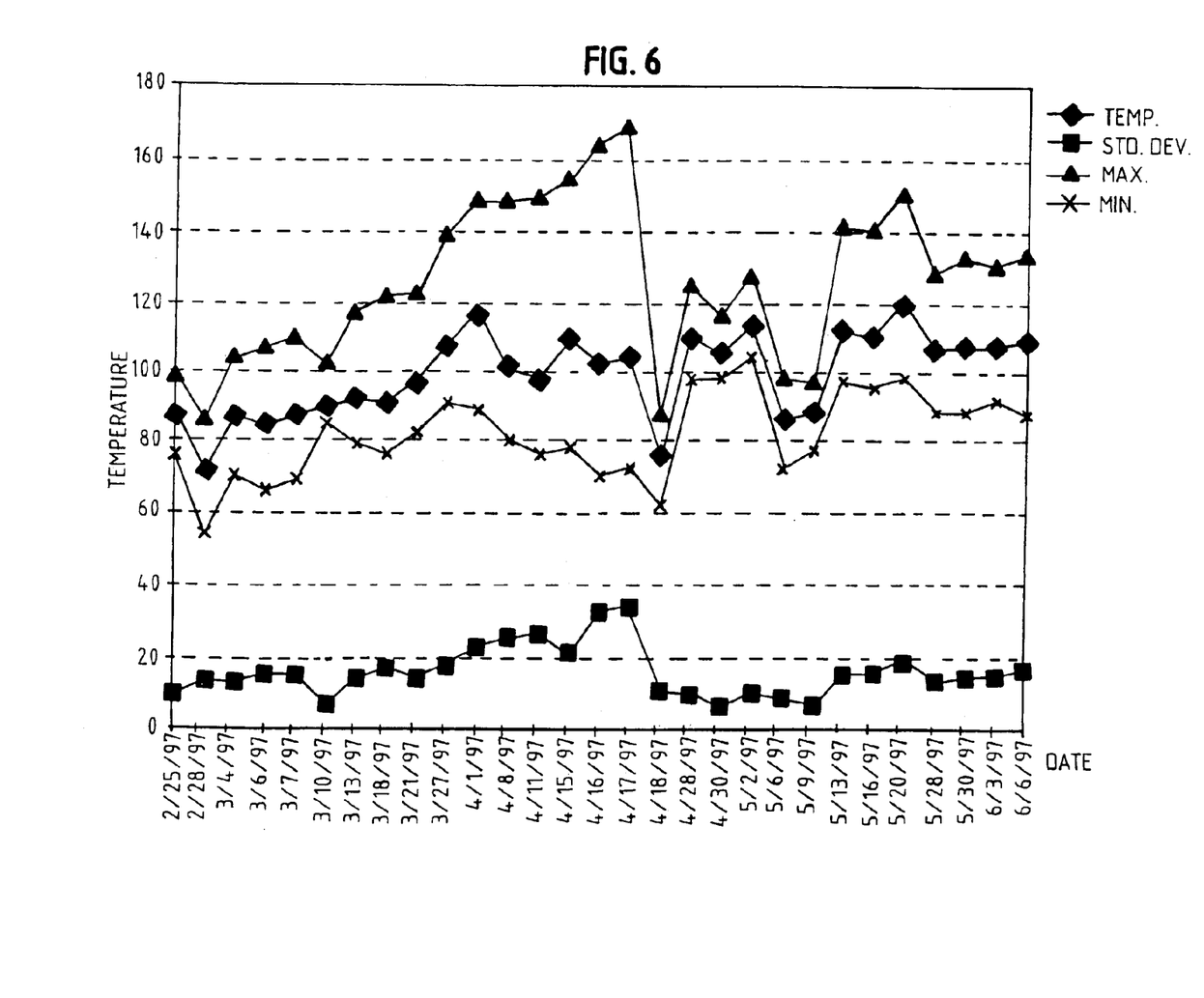
FIG. 6 is a plot of the internal temperature of a landfill undergoing decomposition as prepared according to Example No. 1.

When measurements of temperature and gas effluent showed higher than desired levels (168° F. and methane 30 percent, respectively), the air flow was reduced into the zone in an effort to lower the presumed aerobic-activity-produced heat load. The temperature again increased as shown in FIG. 6 indicating that the temperature and methane rise related to anaerobic-thermophilic activity. Then the affected zone was flooded with high volumes of air and water, resulting in an immediate reduction in temperature and methane gas levels.

Surface settlement was obvious, indicated by slight surficial depressions, cracks, and higher injection well stickups. The primary leachate flowmeter showed a significant decrease in recovered leachate, resulting in the decision to pump supplemental water into the system from the nearby rainfall retention pond.

About 5 months after beginning air injection, in-situ temperature measurements showed a spread of warmer temperatures throughout the test cell and the earlier high temperatures had stabilized as a result of air and water flooding. The resultant stabilization of temperature shows that coarse control of the in-situ processes is possible with an appropriately designed system. Survey measurements of in-place monuments showed a slight surface settlement of 0.3 feet at one monument.

Sampling of the in-situ trash at various depths occurred using a 6-inch outside diameter auger was used to drill into the active test cell. The actual process of augering was noticeably less difficult than the drilling activity when the injection wells were installed. Samples of in-situ waste were collected at 5 feet intervals. Field observations of the in-situ waste showed the material to be substantially degraded and relatively uniform in color and appearance (excepting pieces of metal, plastic, or other nondegraders), but much drier than anticipated. Noxious odors, typical of anaerobic landfill processes, were not observed during the drilling activity. Somewhat higher levels of methane were recorded by field instrumentation when the penetration was greater than 20 feet deep, apparently indicating some anaerobic processes remain active, but apparently only deep and near the liner.

Based on interpretation of the observations made during the drilling and sampling the team decided to deliver additional water into the test cell using horizontal trenches across the top of the landfill cell. Seven trenches were dug to the top-most layer of trash in the test cell and lined with fabric and pea gravel. A three inch perforated plastic pip was laid on top of the gravel and then the trench was backfilled with cover material. Each trench pipe was connected to a header system designed to maintain equal flow across the trench based on water column height. The header system was, in turn, connected to a pump delivering water from the sediment detention pond located west of the test cell.

During months 7 and 8, air and water were continued to the cell and some "hot" areas occurred in shallow areas along the trench lines. When hot areas were encountered the addition of more water and air resulted in cooling of the hot area. Monitoring of the system temperatures continued on a daily basis.

The trenches produced mixed results. While achieving the purposes of getting more water to the upper fill material, the water volume was difficult to control and regulate to the degree desired for this process. Subsequent to the addition of water through the trenches, the upper areas of the fill heated up, indicating increased biological activity in those zones. Isolated areas of the fill could not accept the flow being delivered by the trenches, resulting in significant seeps of water appearing at some areas of the fill. The results from experiments with the trenches have shown the need to deliver adequate water to the shallow zone of the fill. The results demonstrated that control of the water volume additions via trenches was difficult and would not be suitable for use on the sides and terraces of a larger cell.

Accurate values of the amounts of water pumped into the cell are not available because of the intermittent problems with flowmeters, particularly the meter on the leachate sump. The flow rates in the system were often low enough to allow flow through the meter without overcoming the inertia of the impeller, thus the meter failed to record all of the water pumped through it. During the 9½ month period of air injection, at least 1,766,200 gallons of water were pumped into the cell. This is an average of 47,735 gallons per week or 6,819 gallons per day. The measured flow from the leachate sump totaled 703,920 gallons over the same period or 19,024 gallons per week (2,717 gallons per day.) The difference between total water pumped and leachate pumped represents make-up water that was provided from a number of sources, primarily city water and water from a nearby sediment pond. Not all of the water shown as being recycled from the leachate sump was actually leachate from the test. The breakout of seeps along some sides of the cell necessitated installing surface water control and pumping the contained surface water into the leachate system for recycling back into the cell.

TABLE 1

Average moisture content of bulk-fill material as a function of depth from seven test holes.

| Depth (feet) | Moisture Content (% wet weight basis) |
| --- | --- |
| 0–5 | 24.3 |
| 5–10 | 26.5 |
| 10–15 | 29.3 |
| 15–20 | 39.5 |
| 20–25 | 54.5 |

Two conclusions to note related to water additions are 1) the aerobic bioreduction process requires tremendous quantities of water and 2) the quantity of leachate produced within a cell is entirely inadequate to supply the water requirements of the aerobic bioreduction process. Through the period of water additions discussed above, an average of approximately 25 gallons of water was added per cubic yard of fill with no noticeable increase in the quantity of leachate produced by the cell. Much of the water was lost due to vapor diffusion through the boundaries of the cell and some water merely raised the moisture content of the fill without exceeding its waste holding capacity. Additional water from other sources is required to meet the water capacity demand for aerobic biodegradation.

Prior to initiation of air injection, the average landfill gas composition was approximately 46% methane and 54% carbon dioxide with negligible oxygen present. Shortly after beginning air injection, the levels of methane and carbon dioxide were reduced to averages of less than 10 percent and 20 percent respectively. Simultaneously, the oxygen levels in the gas increased to approximately 10 percent. Because of the experimental nature of this system, operating conditions were seldom held constant for long as a s result of changes such as reconfiguring air and water delivery.

During the initial operation of the air injection system, the air delivery rate was approximately 200 cubic feet per minute (cfm). After about 8 months, an additional positive-displacement blower was added to the system to increase air capacity by 500 cfm. With a total of 700 cfm of air being delivered, the concentrations of methane and carbon dioxide were reduced to the single low digits.

These results demonstrate that although the initial air injection rate was only 200 cfm, it was sufficient to convert the majority of the landfill to an aerobic metabolism. Further addition of air injection capacity pushed more of the fill into aerobic metabolism, but did not eliminate all areas of anaerobic metabolism.

The temperature of the landfill mass indicated the extent of aerobic biological metabolism. Prior to air injection, the average temperatures of the fill was less than 80° F. Several weeks after air injection began, the average temperature of the test cell exceed 100° F. The test cells never responded as a homogenoeus mass with respect to temperatures. Much higher temperatures were measured in certain areas of the cell than in other. It was assumed that these variation in temperature were related to variations in water content throughout the cell. This was confined when water addition through the trenches was initiated. Areas that had previously shown little temperature increase heated upon in response to the additional water.

Occasionally a small area of the fill would get very hot in excess of 160° F. In these cases analysis of landfill gas composition shown that the area was again producing high concentrations of methane and carbon dioxide, indicating a return to predominately anaerobic metabolism. It was demonstrated in each case that injecting increased quantities of air and water to these locations could reconvert the system to aerobic metabolism and lower the temperatures to close to the average temperature in the fill. This demonstrated the need for individual control of air and water at each injection well, allowing the injection of increased volumes of air and water to specific areas as needed.

What we claim is:

1. A landfill comprising;
   a. a clay seal layer, a liner, a permeable layer, and a municipal solid waste layer having a depth of at least 20 feet wherein the liner is located between the clay seal layer and the permeable layer and wherein the permeable layer is located between the municipal solid waste layer and the liner; and
   b. a plurality of injection wells wherein at least one injection well comprises a bore hole located in the municipal solid waste layer that contains a first injection region located at a first depth below the landfill surface, and a second injection region located at a second depth from the landfill surface where the first depth and the second depth is separated by a distance of from 10 to about 40 feet and wherein the at least one injection well includes an air injection pipe and a moisture injection pipe.

2. The landfill of claim 1 wherein the injection wells are laterally separated by a distance of from about 40 feet to about 70 feet.

3. The landfill of claim 1 wherein at least one well comprises a bore hole containing a first moisture injection region located at a first depth below the landfill surface, and a second moisture injection region located at a second depth below the landfill surface where the first depth and the second depth is separated by a distance of from 10 to about 40 feet.

4. The landfill of claim 1 wherein at least one well comprises a bore hole containing a first moisture injection region located at a first depth below the landfill surface, a first air injection region located at a first depth below the landfill surface, a second moisture injection region located at a second depth below the landfill surface, and a second air injection region located at a second depth below the landfill surface where the first depth and the second depth is separated by a distance of from 10 to about 40 feet.

5. The landfill of claim 4 wherein the well including a first and a second moisture injection region further includes a third moisture injection region located at a third depth below the landfill surface wherein the third depth is from about 10 to about 40 feet below the depth of the second moisture injection region.

6. The landfill of claim 1 wherein moisture is applied to the landfill using a plurality of drip points.

7. The landfill of claim 6 wherein the plurality of drip points are located at a distance of from about 1 to about 10 feet below the landfill surface.

8. The landfill of claim 6 wherein the plurality of drip points are located at the transition layer dividing the landfill and the landfill cap.

* * * * *